United States Patent [19]
Kobayashi et al.

[11] Patent Number: 5,541,782
[45] Date of Patent: Jul. 30, 1996

[54] MAGNETIC RECORDING AND PLAYBACK APPARATUS CAPATIBLE WITH CONVENTIONAL VIDEO SIGNAL RECORDING FORMAT

[75] Inventors: Kaoru Kobayashi, Yokohama; Kenji Shibayama, Tokyo, both of Japan

[73] Assignee: Victor Company of Japan, Ltd., Yokohama, Japan

[21] Appl. No.: 425,339

[22] Filed: Apr. 18, 1995

Related U.S. Application Data

[63] Continuation of Ser. No. 127,751, Sep. 27, 1993, abandoned.

[30] Foreign Application Priority Data

Sep. 28, 1992 [JP] Japan .................. 4-292330

[51] Int. Cl.⁶ .................. H04N 5/78
[52] U.S. Cl. .................. 360/33.1; 360/9.1; 360/22
[58] Field of Search .................. 360/33.1, 22, 9.1; 358/335; 348/458

[56] References Cited

U.S. PATENT DOCUMENTS

| | | | |
|---|---|---|---|
| 4,222,078 | 9/1980 | Bock | 360/9.1 |
| 4,496,995 | 1/1985 | Colles et al. | 360/33.1 X |
| 4,614,980 | 9/1986 | Ninomiya et al. | 360/33.1 X |
| 4,825,301 | 4/1989 | Pape et al. | 360/33.1 |
| 4,897,739 | 1/1990 | Hasegawa et al. | 360/33.1 |
| 5,111,303 | 5/1992 | Senso et al. | 360/9.1 X |
| 5,162,922 | 11/1992 | Takemuro et al. | 360/22 X |
| 5,212,550 | 5/1993 | Park | 348/458 |

FOREIGN PATENT DOCUMENTS

| | | |
|---|---|---|
| 0226796 | 7/1987 | European Pat. Off. . |
| 0241227 | 10/1987 | European Pat. Off. . |
| 1054982 | 2/1989 | Japan . |
| 2-132601 | 5/1990 | Japan . |
| WO82/01971 | 6/1982 | WIPO . |

*Primary Examiner*—Andrew L. Sniezek
*Attorney, Agent, or Firm*—Michael N. Meller

[57] ABSTRACT

An HD image signal is recorded and reproduced by a tape head system of a conventional home VTR. An HD image signal (bb) which is of a different broadcasting system from a conventional broadcasting system and contains an information whose amount is larger than that contained in a video signal of the conventional broadcasting system is divided by four by first to eighth memories and resultant four signals are recorded on a magnetic tape through a first to fourth recording signal processing circuits and FM modulators, etc. In reproduction, the four signals are reproduced by FM demodulators and a first to fourth reproduced signal processing circuits, etc., and the HD image signal is produced by using the first to eighth memories.

1 Claim, 10 Drawing Sheets

MAGNETIC RECORDING AND PLAYBACK APPARATUS CAPATIBLE WITH CONVENTIONAL VIDEO SIGNAL RECORDING FORMAT

This application is a continuation of application Ser. No. 08/127,751, filed Sep. 27, 1993, now abandoned.

BACKGROUND OF THE INVENTION

1. Field of the Invention

The present invention relates to a magnetic image signal recording and playback apparatus in which a high definition image signal is converted into a video signal of NTSC or PAL system, etc., and the video signal is recorded.

2. Description of the Prior Art

With recent increase of display screen size and recent improvement on image definition, the Industry Standard High-Definition (referred to as "HD", hereinafter) TV system is developed and is wide spreading through satellite broadcastings, etc.

The number of effective video scanning lines of 1 frame in the HDTV system is 1035 which is about 2.2 times the number of effective video scanning lines of 1 frame in the NTSC system which is 480 and its field frequency is 60 Hz which is substantially equal to 59.94 Hz of the NTSC system. The resolution of the HD signal having frequency band of 20 MHz is about 1000 TV's/effective scanning lines (horizontal resolution) while that of the NTSC signal having frequency band of 4.2 MHz is about 450 TV's/effective scanning lines (horizontal resolution).

It is clear from the above mentioned numerical values that the HD signal contains information in both vertical resolution and horizontal resolution about 2.2 times that of the NTSC signals.

In order to record/reproduce such HD signal, a dedicated recording/reproducing apparatus such as ½-inch cassette High-Definition TV VTR (a standard established by Japan Broadcasting Corporation/NHK) or MUSE (Multiple Sub-Nyquist Sampling Encoding System)—VTR, etc., is necessary. On the other hand, there is a method of recording and reproducing the HD signal without using such dedicated apparatus. In such method, an HD signal is converted into a conventional video signal by means of, for example, an HD to NTSC converter or a MUSE to NTSC converter and the video signal thus converted is recorded/reproduced by means of a VTR of the conventional system.

It is well known that the ½-inch cassette High-Definition TV VTR or the MUSE-VTR, etc., dedicated to the HD signal is very complicated and expensive and can not record/reproduce the video signal of the conventional system.

In the method of recording and reproducing the HD signal without using such dedicated apparatus, in which an signal is converted into a conventional video signal by means of, for example, an HD to NTSC converter or a MUSE to NTSC converter and the video signal thus converted is recorded/reproduced by means of a VTR of the conventional system, it is impossible to record an original high definition signal or a wide image.

SUMMARY OF THE INVENTION

An object of the present invention is to solve the above mentioned defects of the conventional techniques related to the HD signal.

According to the present invention, the object can be achieved by a magnetic recording and playback apparatus which comprises dividing means for dividing a high definition video signal, which is of a broadcasting system different from a conventional broadcasting system and contains a larger amount of information than that contained in a video signal of the conventional broadcasting system, to a plurality of video signals of the conventional system or video signals interchangeable with the conventional system video signals, a plurality of recording signal processing means for processing the conventional system video signals or the video signals interchangeable with the conventional system video signals, a plurality of recording means for recording outputs of the recording signal processing means on a recording medium simultaneously, a plurality of reproduced signal processing means for reproducing a plurality of output signals of the plurality of the recording process means from the recording medium simultaneously and processing them to reproduce the conventional system video signals or the video signals interchangeable with the conventional system video signals, and multiplexing means for multiplexing the outputs of the plurality of the reproduced signal processing means to produce the high definition video signal.

According to another aspect of the present invention, a magnetic recording and playback apparatus comprises dividing means for dividing a high definition video signal to band compressed 1st to Nth video signal components by picking up the high definition video signal every Nth scanning line, 1st to Nth recording signal processing means for processing the respective 1st to Nth video signal components, 1st to Nth recording means for recording 1st to Nth signals output from the 1st to Nth recording signal processing means on a recording medium simultaneously, 1st to Nth reproduced signal processing means for reproducing the 1st to Nth output signals of the 1st to Nth recording process means from the recording medium simultaneously and processing them to reproduce the 1st to Nth video signals, and multiplexing means for multiplexing the outputs of the 1st to Nth reproduced signal processing means to produce the high definition video signal.

According to a further aspect of the present invention, a magnetic recording and playback apparatus comprises dividing means for producing band compressed first and second video signals by picking up a MUSE signal obtained by band compression of a high definition signal every other scanning line, first and second recording signal processing means for processing the respective first and second video signals, first and second recording means for recording outputs of the first and second recording signal processing means simultaneously on a recording medium, first and second reproduced signal processing means for reproducing the first and second signals from the first and second recording signal processing means from the recording medium simultaneously and processing them to reproduce the first and second video signals, and multiplexing means for multiplexing the outputs of the first and second reproduced signal processing means to produce the MUSE signal.

Other objects and features of the present invention will become apparent from the following detailed description of preferred embodiments in conjunction with the accompanying drawings.

DETAILED DESCRIPTION OF THE PREFERRED EMBODIMENTS

A magnetic recording and playback apparatus according to the present invention will be described in detail with reference to the accompanying drawings, in which same reference numerals and symbols are used to denote like or equivalent elements. Therefore, such elements will be described in detail at only first occurrences thereof in the specification without duplication.

Briefly, the present invention provides a video signal recording apparatus capable of recording either a video signal of a conventional system such as NTSC or a high definition video signal such as HD by recording the latter after converted into video signal of such as NTSC system and capable of providing a reproduced image which can be received by either a high definition receiver or a TV receiver of NTSC system. In the following description, a video signal of NTSC system will be referred to a conventional video signal aa and an HD image signal bb will be referred to as a typical example of high definition signals such as HD signal, MUSE signal and EDTV signal, etc.

As mentioned, the vertical and horizontal resolutions of the HD image signal bb are about 2.2 times those of the video signal aa, respectively, and an amount of information thereof per frequency band is about 4 times that of the video signal aa. On the other hand, for a home VTR of NTSC system, its horizontal resolution is not limited by the NTSC system and the VTR of, for example, S-VHS system can record a frequency band up to about 5.2 MHz (560 TV's/ effective scanning lines). In the present invention, the HD image signal bb is recorded and reproduced by dividing it by 4 to make an amount of information of each of the 4 signal components substantially equal to that of the video signal aa.

Figure 1:
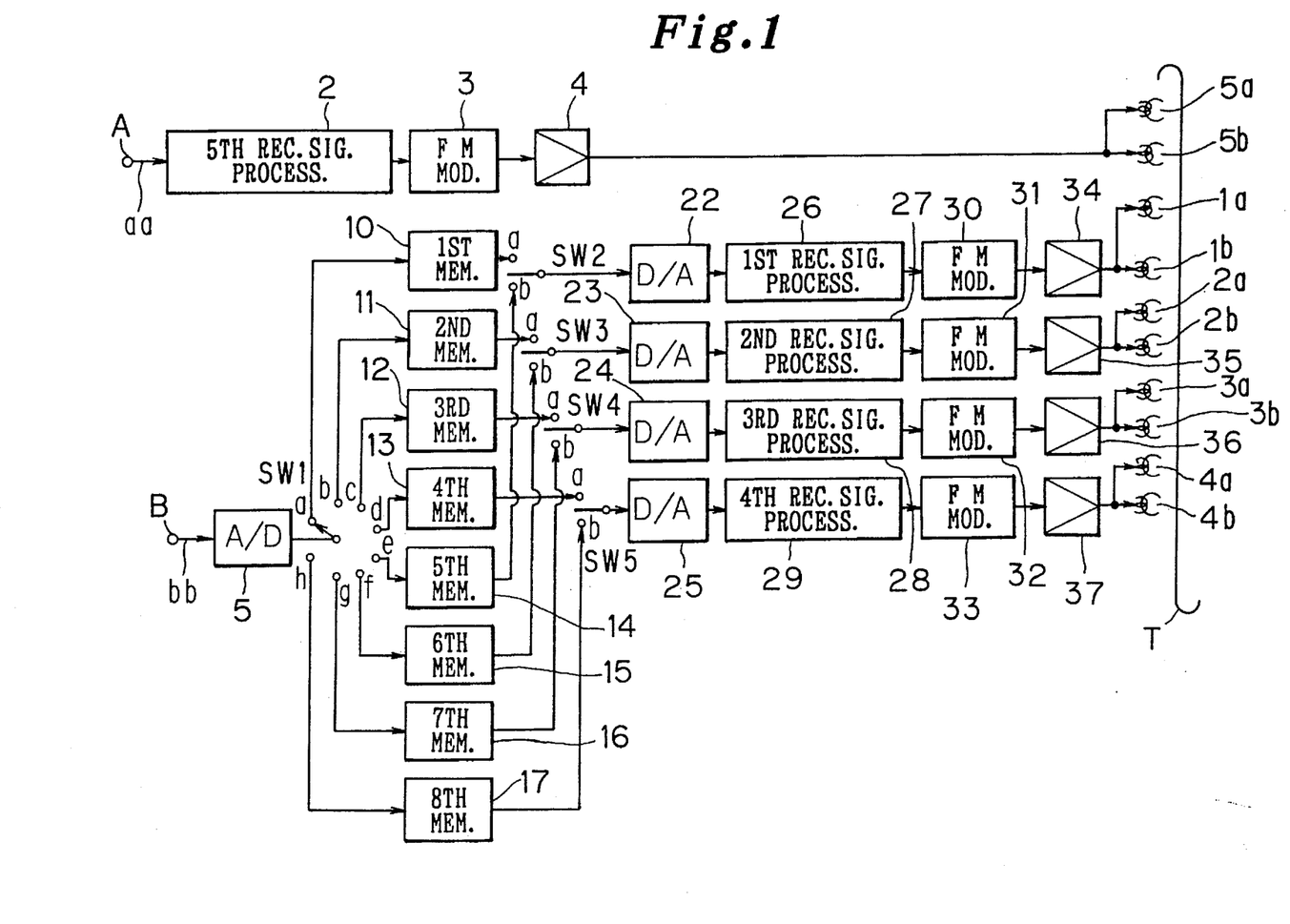
FIG. 1 is a block circuit diagram of a main portion of a recording system of a video tape recorder according to a first and second embodiments of the present invention.
Figure 2:
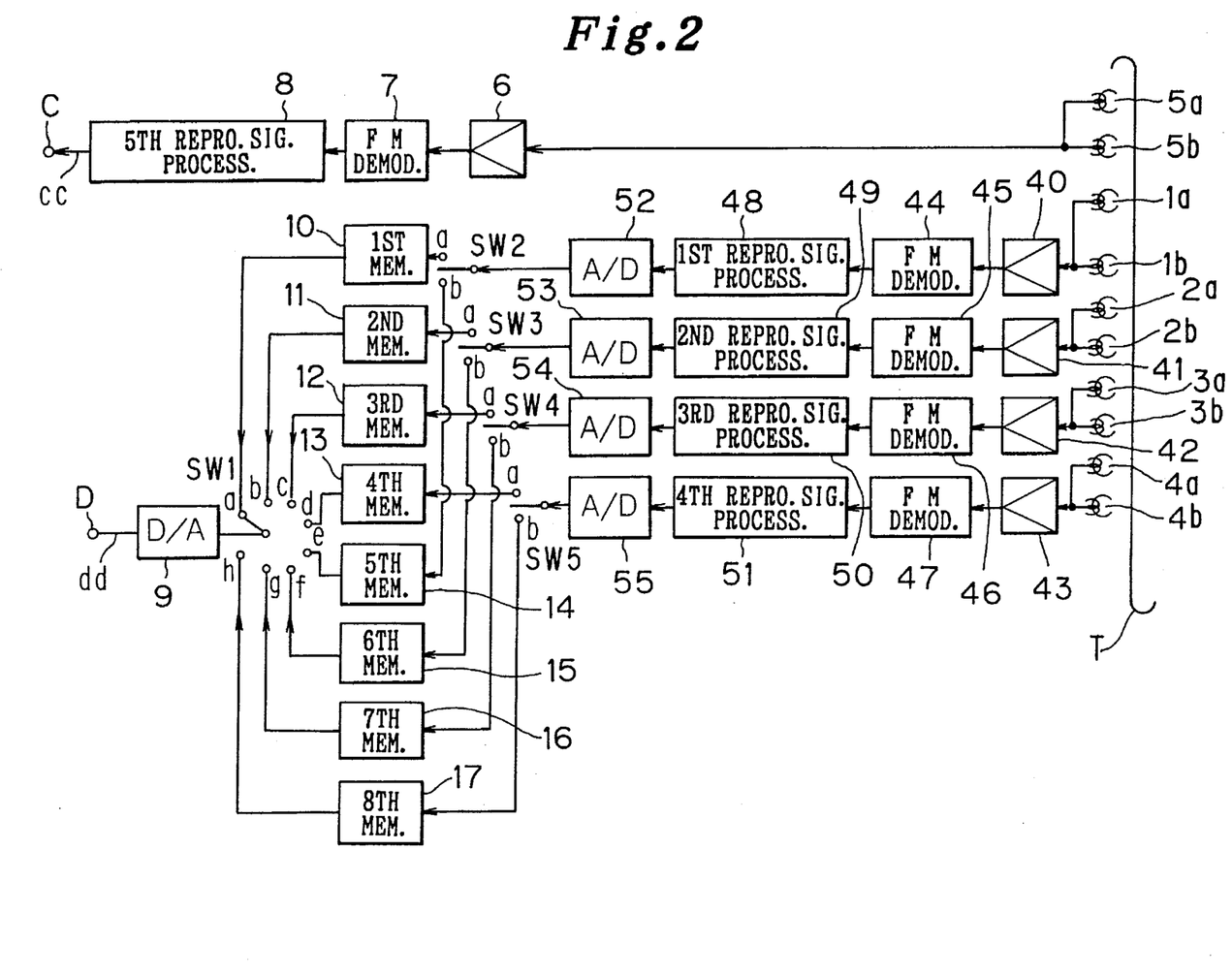
FIG. 2 is a block circuit diagram of a main portion of a reproducing system of a video tape recorder according to a first and second embodiments of the present invention.
Figure 3:
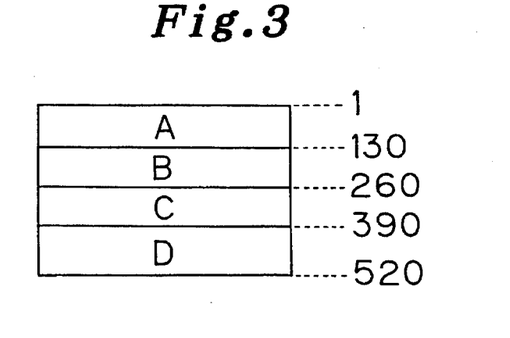
FIG. 3 illustrates regions to be divided.
Figure 4:
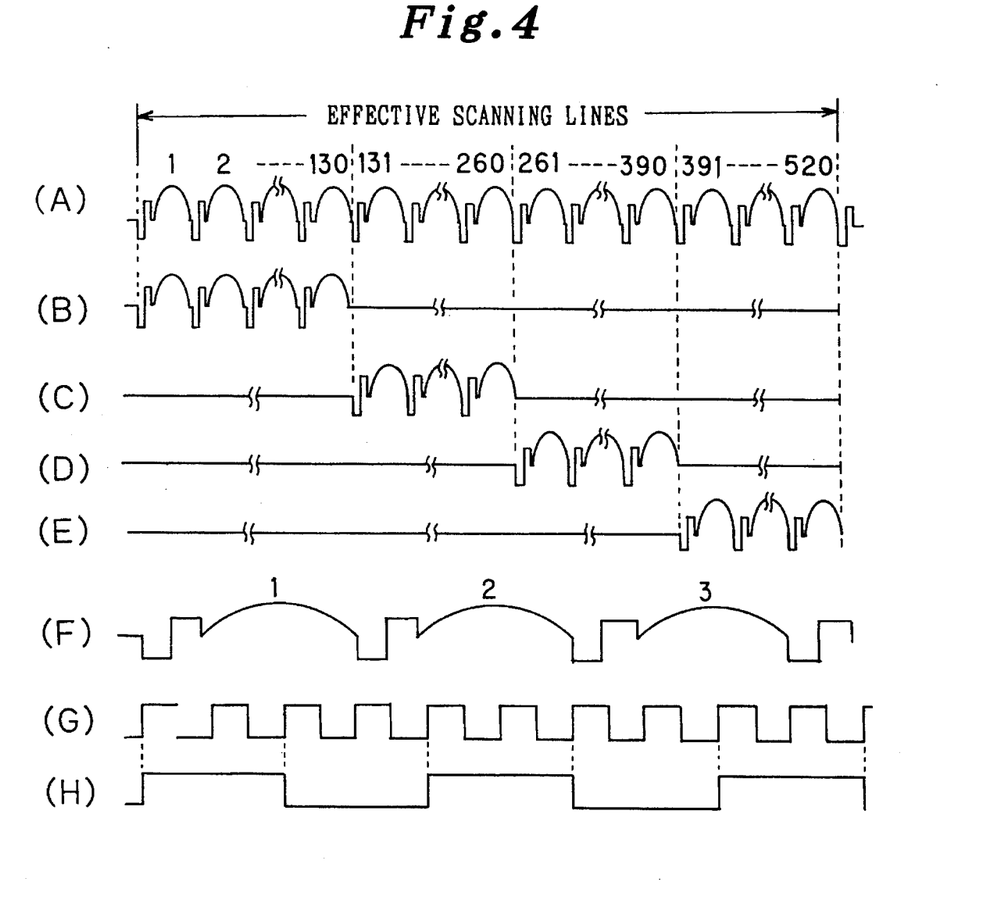
FIG. 4 is a timing chart of an operation of the recording system of the VTR according to the first embodiment of the present invention.
Figure 5:
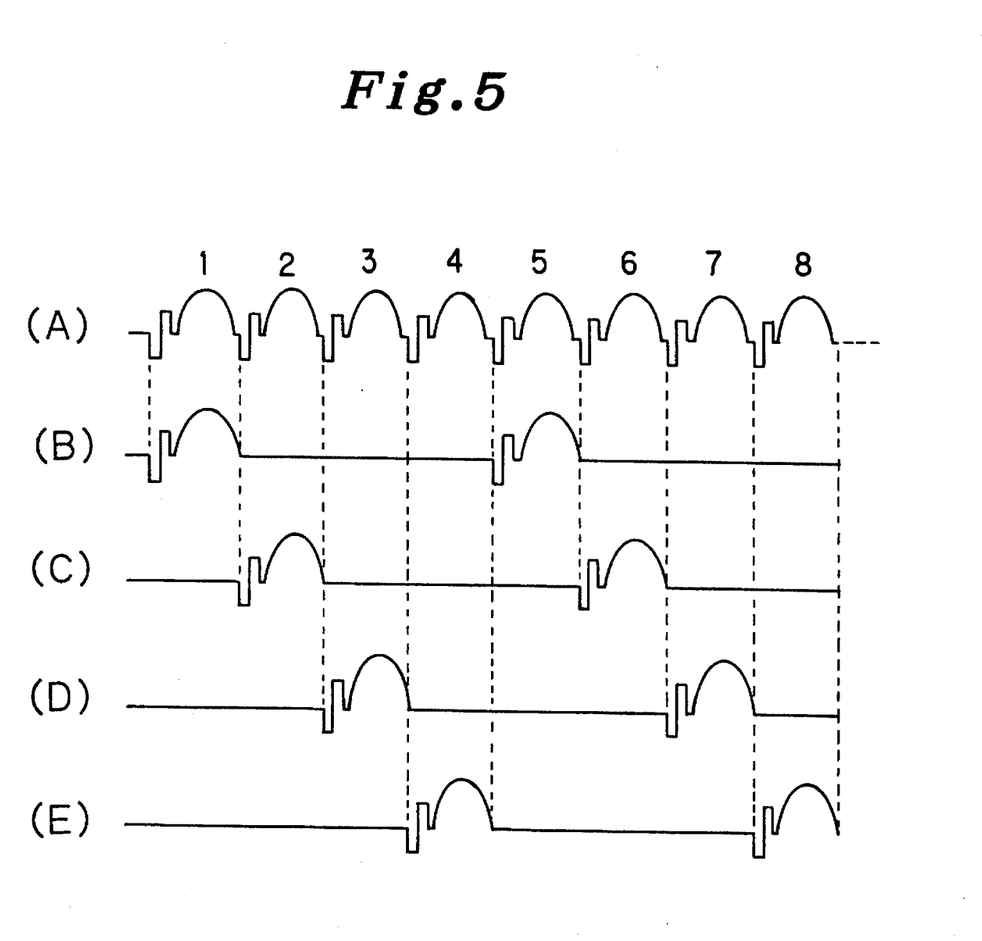
FIG. 5 is a timing chart of an operation of the recording system of the VTR according to the second embodiment of the present invention.
Figure 6:
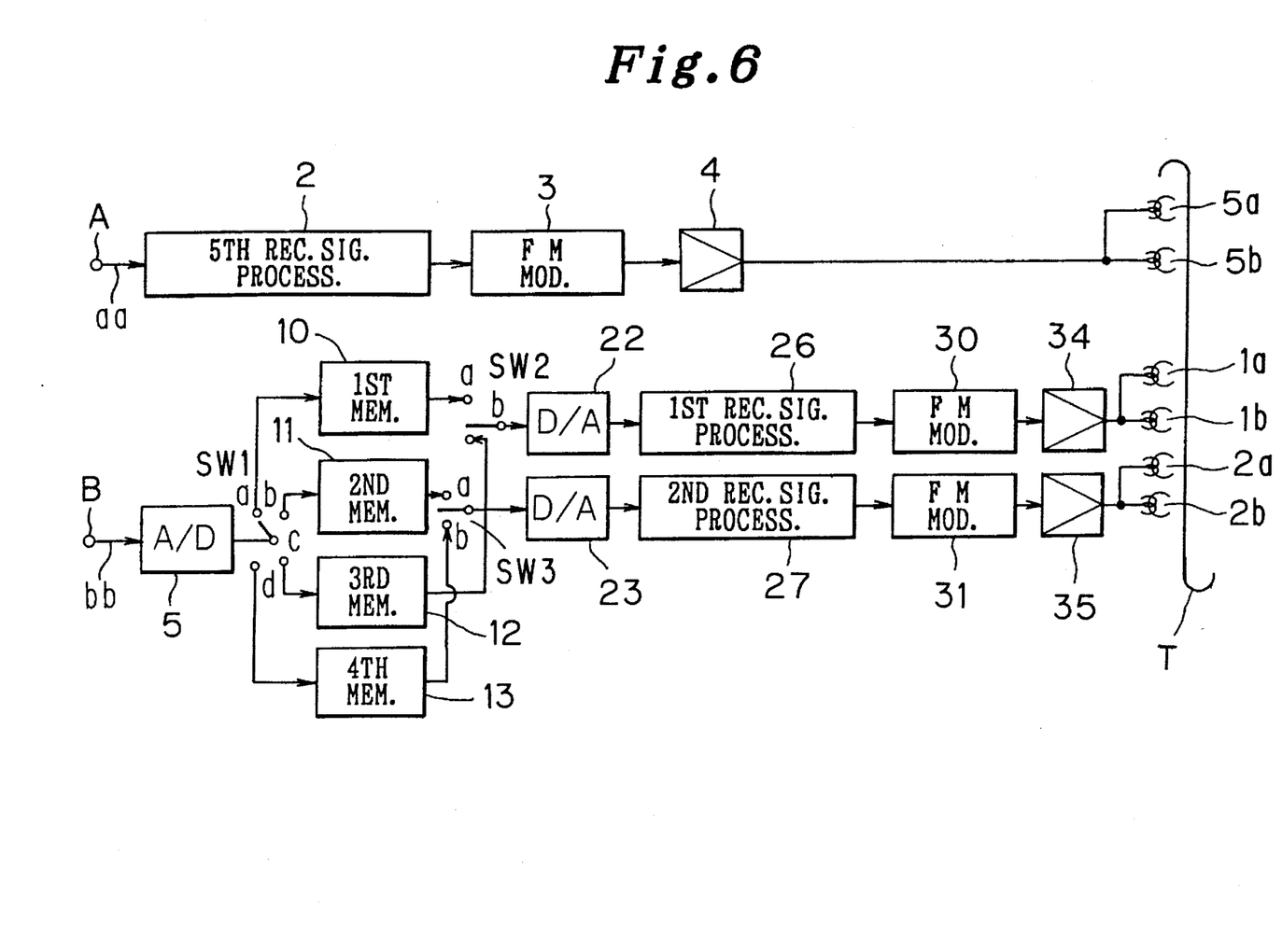
FIG. 6 is a block circuit diagram of a main portion of a recording system of a video tape recorder according to a third embodiment of the present invention.
Figure 7:
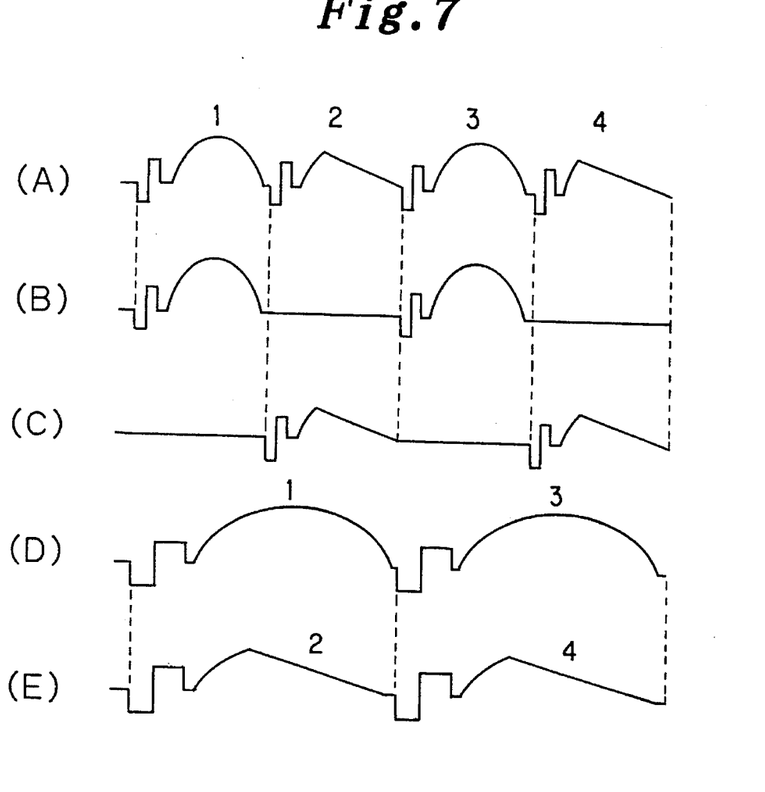
FIG. 7 is a timing chart of an operation of the recording system of the VTR according to the third embodiment in FIG. 6.
Figure 8:
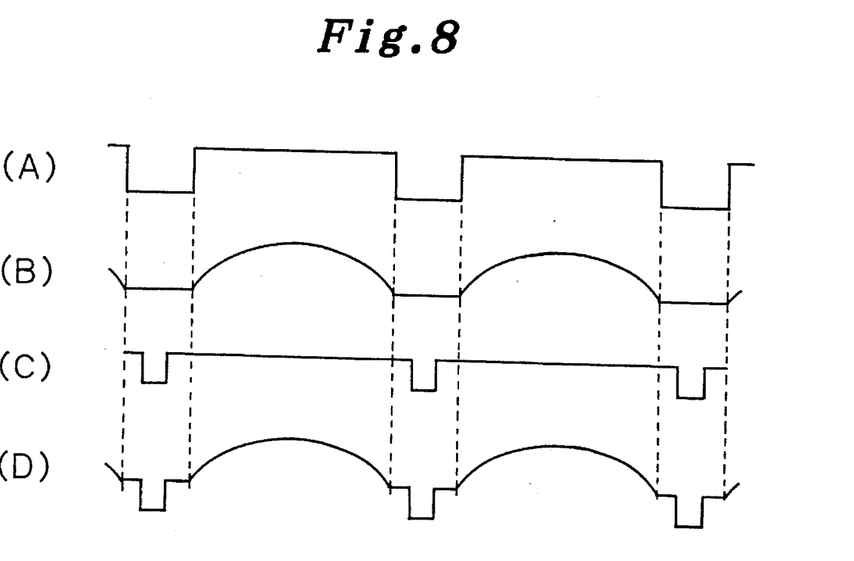
FIG. 8 is a timing chart showing an output signal of a memory.
Figure 9:
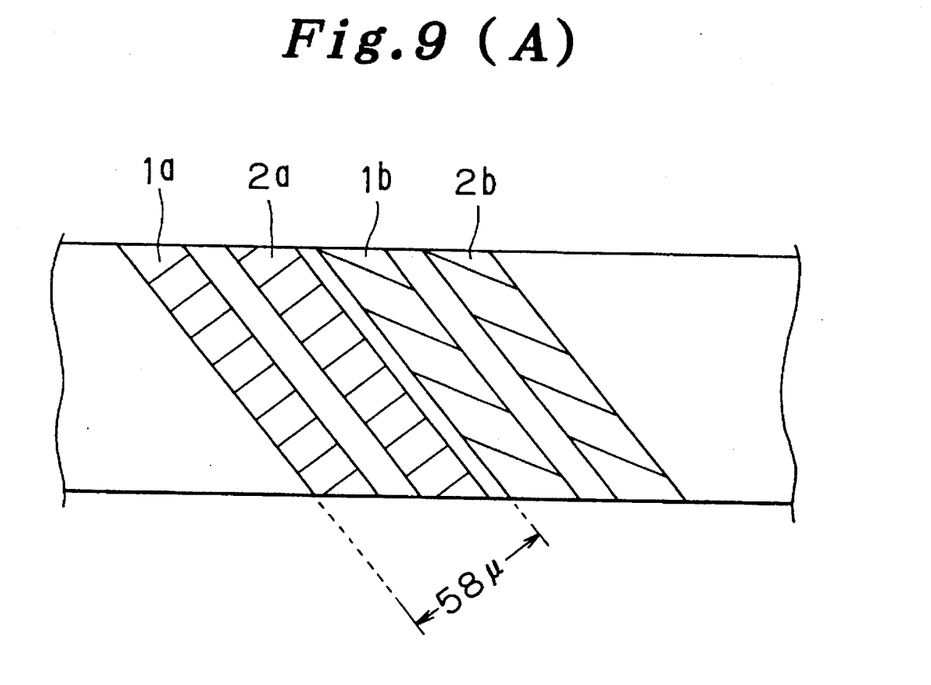
FIGS. 9a and 9b illustrate recording patterns on a magnetic tape.
Figure 10:
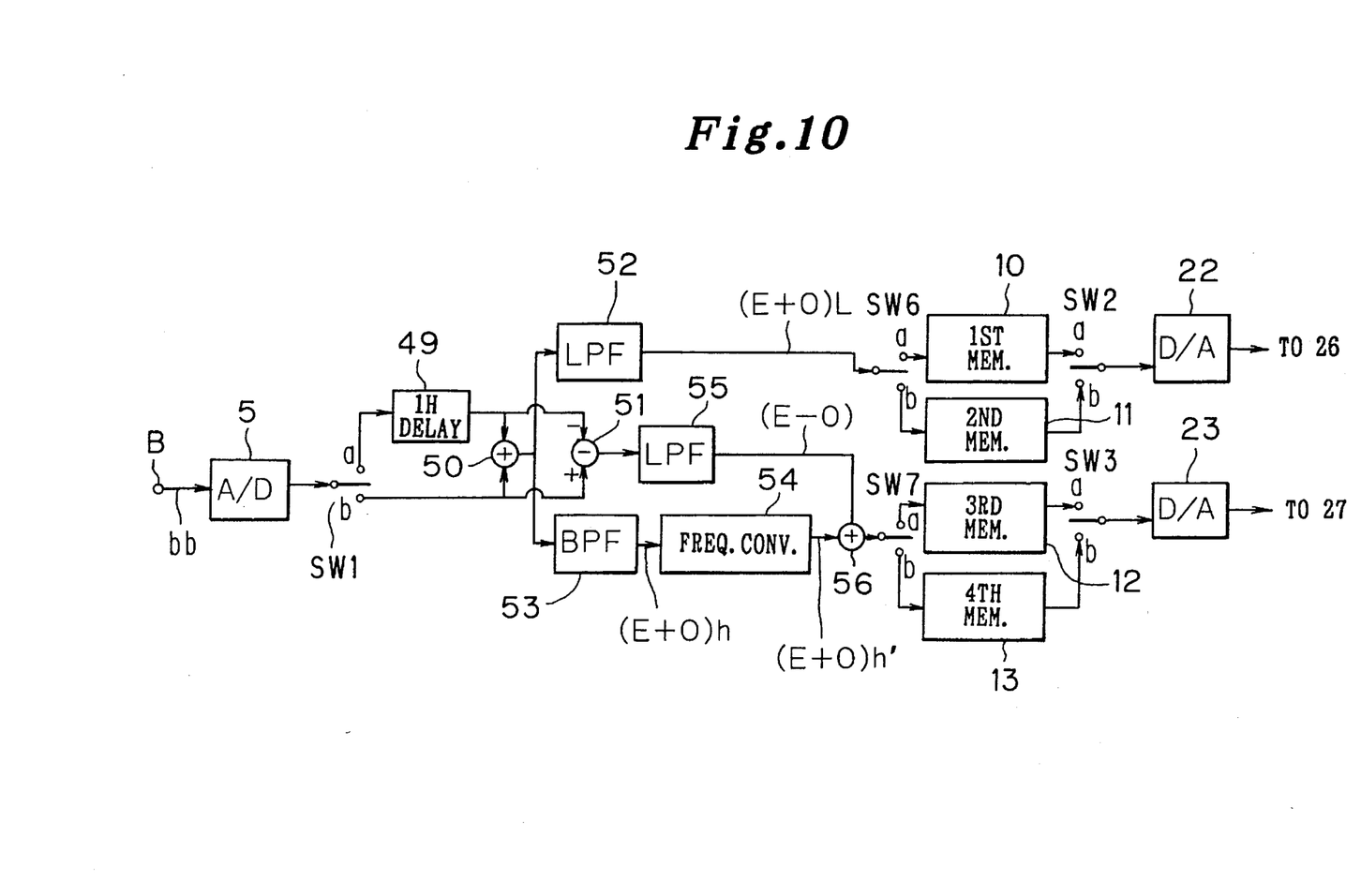
FIG. 10 is a block circuit diagram of a main portion of a recording system of a video tape recorder according to a third embodiment of the present invention.
Figure 11:
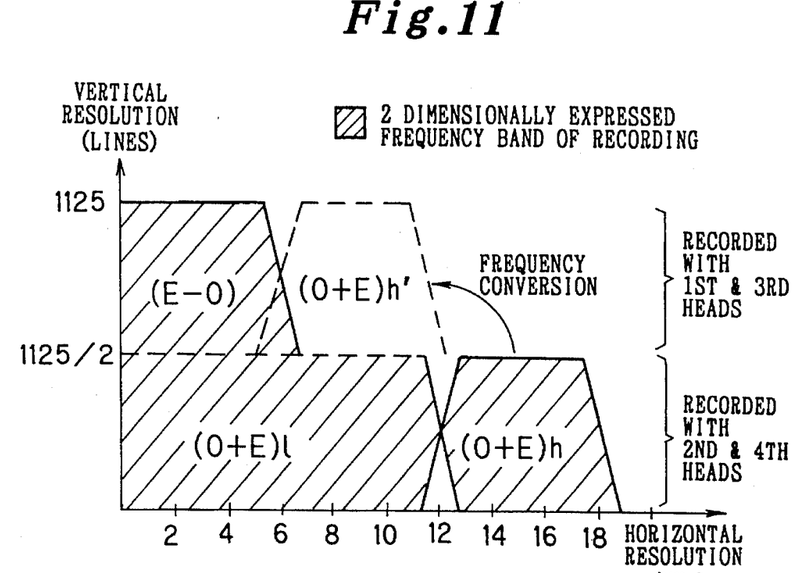
FIG. 11 illustrates a recording two dimensional frequency band.
Figure 12:
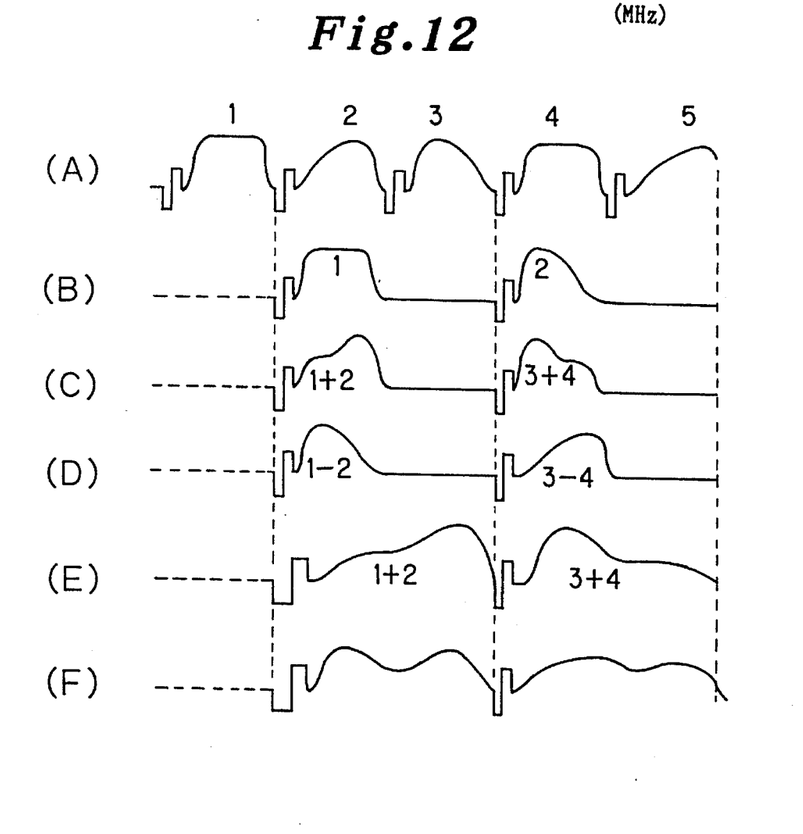
FIG. 12 is a timing chart of an operation of the recording system of the VTR according to the third embodiment in FIG. 10.
Figure 13:
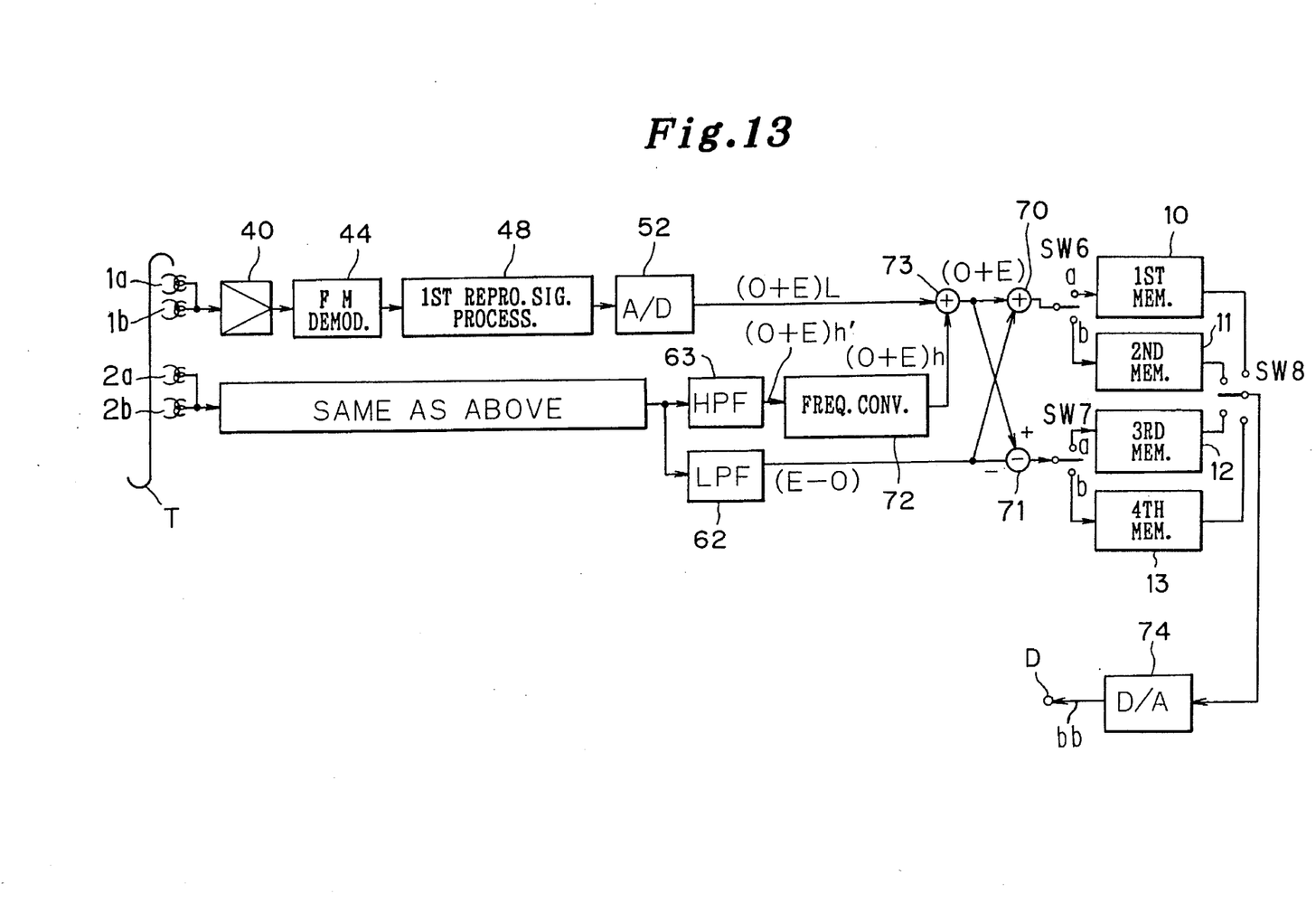
FIG. 13 is a block circuit diagram of a main portion of a reproducing system of a video tape recorder according to a fourth embodiment of the present invention.

FIG. 1 is a block diagram of a main portion of a recording system of a VTR according to a first embodiment as well as a second embodiment of the present invention, FIG. 2 is a block circuit diagram of a main portion of a reproducing system of a video tape recorder according to the first or second embodiment of the present invention. FIG. 3 illustrates regions to be divided, FIG. 4 is a timing chart of an operation of the recording system of the VTR according to the first embodiment of the present invention, FIG. 5 is a timing chart of an operation of the recording system of the VTR according to the second embodiment of the present invention, FIG. 6 is a block circuit diagram of a main portion of a recording system of a video tape recorder according to a third embodiment of the present invention, FIG. 7 is a timing chart of an operation of the recording system of the VTR according to the third embodiment in FIG. 6, FIG. 8 is a timing chart showing an output signal of a memory, FIG. 9 illustrates a recording pattern on a magnetic tape, FIG. 10 is a block circuit diagram of a main portion of a recording system of a video tape recorder according to a third embodiment of the present invention, FIG. 11 illustrates a recording two dimensional frequency band, FIG. 12 is a timing chart of an operation of the recording system of the VTR according to the third embodiment in FIG. 10 and FIG. 13 is a block circuit diagram of a main portion of a reproducing system of a video tape recorder according to a fourth embodiment of the present invention.

[First Embodiment]

The first embodiment resides in a VTR which records and reproduces regions A to D shown in FIG. 3 which are portions of an HD image signal bb and obtained by dividing the latter every 131st effective scanning line, simultaneously.

In FIG. 1, a video signal aa is supplied through an input terminal A to a fifth recording signal processing circuit 2 in which it is subjected to a recording processing such as pre-emphasis, etc. Then it is FM-modulated by an FM modulator 3, given a predetermined recording current characteristics by a recording amplifier 4 and recorded on a magnetic tape T through a fifth pair of heads 5a and 5b which are mounted on a rotary drum at positions spaced apart by 180°. The FM modulator 3 and the recording amplifier 4 may be FM modulators 30 to 33 and recording amplifiers 34 to 37 to be described later, respectively. In such case, a switch circuit may be provided between a first recording signal processing circuit 26 and the first FM modulator 30 to supply an output signal of the fifth recording signal processing circuit 2 and a switch circuit may be provided between the recording amplifier 34 and a first pair of heads 1a and 1b to supply an output signal of the recording amplifier 34 to the fifth head pair 5a and 5b.

On the other hand, the HD image signal bb is supplied through an input terminal B to an A/D converter 5 in which it is converted into a digital signal which is supplied to a first switch circuit SW1. By connecting the first switch circuit SW1 to a contact "a", 130 effective scanning line signals corresponding to upper one fourth of a first field image screen area (region A in FIG. 3) are written in a first memory 10. Similarly, scanning line signals from a 131st to 260th scanning lines corresponding to a middle upper one fourth of the first field image screen (region B in FIG. 3) are written in a second memory 11 by switching the connection of the first switch circuit SW1 to a contact "b", scanning line signals from a 261st to 390th scanning lines corresponding to a middle lower one fourth of the field image screen (region C in FIG. 3) are written in a third memory 12 by switching the first switch circuit SW1 to "a" contact "c" and scanning line signals from a 391st to 520th scanning lines corresponding to a lower one fourth of the field image screen (region D in FIG. 3) are written in a fourth memory 13 by switching the switch circuit SW1 to a contact "d".

Then, scanning line signals of an upper one fourth, a middle upper one fourth, a middle lower one fourth and a lower one fourth of a second field are written in a fifth to eighth memories 14 to 17 in the similar manner to that for the first field by sequentially switching the connection of the first switch circuit SW1 from a contact "e" to a contact "h".

During a period of sequential write of the second field signals in the fifth to eighth memories 14 to 17, the first field signals written in the first to fourth memories 10 to 13 are read sequentially. The signals read from the respective memories are supplied to D/A converters 22 to 25 by switching connections of a second to fifth switch circuits SW2 to SW5 to contacts "a" and converted into analog signals thereby.

This operation will be described in detail with reference to a timing chart shown in FIG. 4. Although a synchronizing signal of the signals to be written in the memories is removed to reduce a memory capacity, such synchronizing signal is attached in FIG. 4 in order to facilitate understanding of the signal timing. FIG. 4(A) shows the HD image signal bb and the signal shown in FIG. 4(B) which corresponds to the region A is written in the memory 10. The signals shown in FIGS. 4(C) to 4(E) which correspond to the regions B to D are written in the second to fourth memories 11 to 13, respectively. The write operation is performed by using a clock WCK shown in FIG. 4(G) and the read is performed by using a read clock RCK shown in FIG. 4(H) whose frequency is one fourth that of the write clock WCK. As a result, a frequency band of the signals read from the first to eighth memories 10 to 17 becomes one fourth that in the write, so that the high frequency band of the HD signal is converted into that of the NTSC system, making it possible to be recorded by a home VTR. For example, the output signal of the first memory 10 becomes such as shown in FIG. 4(F). However, one fourth the horizontal synchronizing frequency of the HD image signal bb which is 33.75 KHz is 8.4375 KHz which is lower than the horizontal synchronizing frequency of the video signal aa which is 15.75 KHz. Therefore, in order to make the effective scanning line period for the read from the memories consistent with the period of NTSC, it is necessary to divide the display screen into two portions precisely.

Incidentally, the first switch circuit SW1 is switched such that a third field is written in the first to fourth memories 10 to 13 in the same manner to the first field while the second to fifth switching circuits SW2 to SW5 are switched such that the signals of the second field are read from the fifth to eighth memories 14 to 17. By alternating this operation repeatedly every field, the frequency band is converted.

The analog signals from the D/A converters 22 to 25 are supplied to a first to fourth recording signal processing circuits 26 to 29 to process them by adding the synchronizing signal of the NTSC system thereto and pre-emphasizing them, etc., respectively. Then, the processed signals are modulated by FM modulators 30 to 33, amplified by recording amplifiers 34 to 37 and recorded simultaneously on the magnetic tape T through one heads 1a to 4a of four pairs of magnetic heads 1a and 1b, 2a and 2b, 3a and 3b and 4a and 4b, the heads of each pair being separated by 180°, respectively. The second field signals are recorded through the other magnetic heads 1b to 4b opposing to the heads 1a to 4a in the similar manner, respectively.

A reproducing operation will be described with reference to FIG. 2. The signals recorded on the magnetic tape T are reproduced through the four pairs of the magnetic heads 1a, 1b to 4a, 4b, amplified by pre-amplifiers 40 to 43 to a predetermined level, demodulated by FM demodulators 44 to 47, processed by a first to fourth reproduced signal processing circuits 48 to 51 complimentarily to the signal processing in the recording, that is, de-emphasizing, etc., and converted into digital signals by A/D converters 52 to 55, respectively.

These digital signals are written in a first to eighth memories 10 to 17 through a second to fifth switch circuits SW2 to SW5, respectively. Assuming reproduction of the first field signals, the digital signals are written in the first to fourth memories 10 to 13 simultaneously by switching connections of the second to fifth switch circuits SW2 to SW5 to contacts "a", respectively. Further, a second field signals are written in the fifth to eighth memories 14 to 17 simultaneously by switching connections of the second to fifth switch circuits SW2 to SW5 to contacts "b", respectively, while the first field signals written in the first to fourth memories 10 to 13 are read in the same sequence as in the write operation during the recording operation. Similarly, third field signals are written simultaneously in the first to fourth memories 10 to 13 while the second field signals are read sequentially. During this reproducing operation, write clock frequency is set identical to a read clock frequency during the recording operation and read clock frequency during the reproducing operation is set identical to the write clock frequency during the recording operation.

The signals read from the memories are made a continuous signal by switching a connection of a first switch circuit SW1 from a contact "a" to a contact "h". The continuous signal is converted into an analog signal by a D/A converter 9, added with a synchronizing signal of the HD image signal bb by a synchronizing signal adding circuit which is not shown and output from an output terminal D to a transmission line which is not shown. Although a signal processing for a chrominance signal of the HD image signal bb is not described, it is clear for those skilled in the art that, by a time division multiplexing of a luminance signal and the chrominance signal, the processing can be performed in a similar manner to that described above.

The HD image signal bb divided to four regions as described can be recorded or reproduced by means of a tape head system of a conventional home VTR such as S-VHS.

[Second Embodiment]

In the first embodiment in which the display screen is divided to four regions to convert an HD image signal into four signals of NTSC system, only a portion of the HD image signal can be reproduced from the converted signals on the display screen. The second embodiment resides in a VTR which records or reproduces such converted NTSC signals by dividing it by four three scanning lines apart so that each NTSC signal covers the whole display screen. The second embodiment differs from the first embodiment in operations related to the first to eighth memories 10 to 17 and therefore only the difference will be described in detail.

Incidentally, since a recording and reproducing operation for the video signal aa in the second embodiment is the same as that in the first embodiment, details thereof is omitted for avoidance of duplication.

Describing first a processing in a recording system with reference to FIG. 1, an HD image signal bb is supplied through the input terminal B to the A/D converter 5 and converted thereby into a digital signal.

For a first field, the first switch circuit SW1 is switched from the terminals "a" to "d", sequentially, to write a first to fourth effective scanning line signals in the first to fourth memories 10 to 13, sequentially. That is, (n×4+1) th scanning line is written in the first memory 10, (n×4+2) th scanning line is written in the second memory 11, (n×4+3) th scanning line is written in the third memory 12 and (n×4+4)th scanning line is written in the fourth memory 13, where "n" is an integer.

For a second field, the first switch circuit SW1 is switched from the terminals "e" to "h", sequentially, to write (n×4+1)th scanning line (shown in FIG. 5(B)) in the fifth memory 14, (n×4+2)th scanning line (shown in FIG. 5(C)) in the sixth memory 15, (n×4+3)th scanning line (shown in FIG. 5(D)) in the seventh memory 16 and (n×4+4)th scanning line (shown in FIG. 5(E)) in the eighth memory 17, in the similar manner. The HD image signal bb is also shown in FIG. 5(A).

At the same time of the write operation of the signals of the second field, the signals of the first field are read from the first to fourth memories 10 to 13 simultaneously. For a third field, signals thereof are written in the first to fourth memories 10 to 13 by switching the first switch circuit SW1 similarly while reading the signals of the second field from the fifth to eighth memories 14 to 17 by switching the second to fifth switch circuits SW2 to SW5 suitably. This is repeated alternatively.

In this operation, frequency of read clock RCK is set to one fourth of frequency of write clock WCK to convert the frequency band into one fourth so that the high frequency band HD signal is converted into the frequency band of NTSC system, in the same way as in the first embodiment. Therefore, it becomes possible to record the HD signal by means of a tape head system of a usual home VTR by processing the band converted signal by a subsequent circuit as in the first embodiment.

A reproducing system of the second embodiment will be described with reference to FIG. 2. Signals in NTSC frequency band are supplied to the first to eighth memories 10 to 17. Signals of a first field are written simultaneously in the first to fourth memories 10 to 13. Signals of a second field are written simultaneously in the fifth to eighth memories 14 to 17 while the first field signals are read as in the recording operation and this is repeated, with the same write and read clocks as those in the first embodiment.

Thus, it becomes possible to reproduce the HD image signal bb before recording. Although a signal processing for a chrominance signal of the HD image signal bb is not described, it is clear for those skilled in the art that, by a time division multiplexing of a luminance signal and the chrominance signal, the processing can be performed in a similar manner to that described above.

The HD image signal bb divided to four regions as described can be recorded or reproduced by means of a tape head system of a conventional home VTR such as S-VHS.

[Third Embodiment]

In the first and second embodiments, the HD image signal bb having horizontal frequency band of 20 MHz is divided to four portions and the four signal systems each in 5 MHz band are processed. Therefore, a circuit construction thereof becomes complicated.

Further, it is known that the transmission of the HD video signal bb is performed by using the analog frequency band compression called MUSE and the MUSE signal is in a frequency band of 20 MHz for still image and of 12 MHz for moving image. Therefore, it may be possible to record and reproduce the HD image signal having the frequency band as narrow as mentioned above by means of a tape head system of a usual home VTR by dividing it to 2 rather than 4.

The third embodiment resides in that an image screen is divided by 2 according to odd numbered scanning lines and even numbered scanning lines to simplify the circuit construction.

First, a recording system of the third embodiment will be described with reference to FIG. 6. Since a system of the video signal aa is the same as that of the first embodiment, details thereof are omitted. On the other hand, the HD image signal bb is supplied through an input terminal B to an A/D converter 5 and converted thereby into a digital signal. A first effective scanning line signal of a first field is written in a first memory 10 by switching a connection of a first switch circuit SW1 to a terminal "a". Similarly, a second scanning line signal is written in a second memory 11 by switching the connection of the first switch circuit SW1 to a terminal "b", a third scanning line signal is written in an area of the first memory 10 subsequent to an area in which the first scanning line signal is written by switching the connection of the first switch circuit SW1 to the terminal "a" again, and so on. Thus, (n×2+1)th scanning line signals are written in the first memory 10 and (n×2+2)th scanning line signals are written in the second memory 11, where n is an integer.

Effective scanning line signals of a second field are written in a third and fourth memories 12 and 13 alternatively by switching the connection of the first switch circuit SW1 between terminals "c" and "d", in the similar manner as in the write of the first field signals. That is, (n×2+1)th scanning line signals are written in the third memory 12 and (n×2+2)th scanning line signals are written in the fourth memory 13. Simultaneously with the write operation of the second field in the memories, the first field scanning line signals written in the first and second memories 10 and 11 are read simultaneously.

This operation of the memories will be described with reference to FIG. 7. Although a synchronizing signal of the signals to be written in the memories is removed to reduce a memory capacity, such synchronizing signal is attached in FIG. 7 in order to facilitate understanding of the signal timing. FIG. 7(A) shows the HD signal bb which is divided by 2 by the switch circuit SW1 to produce outputs signals shown in FIGS. 7(B) and 7(C) at terminals "a" and "b" of the switch circuit SW1, respectively. The output signals are written in the first and second memories 10 and 11, respectively. By reading the signals in the first and second memories 10 and 11 with using read clock frequency set to a half of write clock frequency, output signals shown in FIGS. 7(D) and 7(E) are obtained. A third field scanning line signals are written in the same memories as those storing the first field scanning line signals while the second field scanning line signals are read from the respective memories simultaneously and this operation is repeated alternatively. Thus, the frequency band of the HD video signal is reduced to a half.

However, with the read frequency being a half, a horizontal signal period of the HD image signal bb is 59.26 µs which is not the same as that of the video signal aa which is 63.5 μs. Therefore, in the third embodiment, a timing of reading the signal from the memories is limited in a period in which a control signal is in high level as shown in FIG. 8(A) and the signal obtained by reading the memories with this timing as shown in FIG. 8(B) is added with a synchronizing signal of the video signal aa of NTSC system as shown in FIG. 8(C) by means of a subsequent recording signal processing circuit, resulting in a signal shown in FIG. 8(D). A relation between the output signals from the memories is the same as those in the first and second embodiments.

The signals read from the respective memories are converted into analog signals by D/A converters 22 and 23 to which the synchronizing signals are added by a first and second recording signal processing circuits 26 and 27, respectively, to obtain two signals each being similar to the video signal aa. After subjected to recording processing such as emphasizing, etc., these signals are modulated by FM modulators 30 and 31 and predetermined recording current characteristics are given to them by recording amplifiers 34 and 35, respectively. Then, the processed signals of the first and second fields are recorded on the magnetic tape T through a first and second heads 1a and 2a and a first and second heads 1b and 2b, respectively.

Describing a signal processing in a reproducing operation, it is clear that the signals recorded on the magnetic tape T can be made similar to 2 NTSC signals by reproducing the signals substantially simultaneously through the magnetic heads 1a and 1b or 4a and 4b and subjecting them to an FM demodulation and signal processing such as de-emphasis. For the first field, the signals are written in the first and second memories 10 and 11 simultaneously and the signals of the second field are simultaneously written in the third and fourth memories 12 and 13 while reading the first field signals from the first and second memories 10 and 11 in the same sequence as a write sequence. Similarly, a third field signals are written in the same memories in which the first field signals are written, while reading the second field signals, and so on.

When the HD image signal bb is one such as MUSE signal whose frequency band is compressed as in the case described, it is possible to record and reproduce it with the home VTR by dividing the HD image signal bb.

Assuming that the conventional home VTR is a VTR of VHS system, track width of the first heads 1a and 1b and that of the second heads 2a and 2b are set to 25 μm, respectively, and azimuth angles of the heads 1a and 2a are +6° and those of the heads 1b and 2b are −6°, respectively. Vertical levels of the heads are suitably set so that the magnetic tape is driven with track pitches of the respective heads 1a and 2a and 1b and 2b become 58 μm which is the same as that of the standard mode of the VHS. In this case, a tape pattern shown in FIG. 9(A) is obtained. In this case, the mounting level of the magnetic heads are set such that a guard band between same azimuth angles becomes wider than that between different azimuth angles, by taking cross-talk between adjacent tracks into consideration.

On the other hand, FIG. 9(B) shows a tape pattern when signals are recorded by the conventional home VTR, which is similar to that when the recording is performed by using fifth heads 5a and 5b. Azimuth angles of the fifth heads 5a and 5b are the same as those of the heads 1a and 2a, respectively.

Therefore, when the tape pattern shown in FIG. 9(A) is reproduced by the conventional home VTR by covering the heads 2a and 2b with the head 5a having azimuth angle of +6°, only the head 2a contributes to the reproduction since the head 2b has a different azimuth angle from +6°. With a head having azimuth angle of −6°, only the head 2b contributes thereto. Thus, the tape pattern is reproduced every two tracks. On the contrary, when the tape pattern shown in FIG. 9(A) is reproduced by the conventional home VTR by covering the heads 2a and 2b with the head 5b having azimuth angle of −6°, only the head 2b contributes to the reproduction. Thus, it is possible to selectively reproduce the tape pattern by changing the tracking position.

As described, it is possible to reproduce the MUSE signal recorded on the magnetic tape according to the VTR of the present invention by means of the conventional home VTR and, since the signal reproduced every two tracks is one down-converted to NTSC, it is possible to watch it on an NTSC receiver.

[Fourth Embodiment]

In the first and second embodiments in which the HD video signal bb is converted into a plurality of NTSC signals, the vertical resolution is kept as that of the HD video signal bb. In the fourth embodiment, the HD image signal is compressed in frequency band by removing an oblique resolution and vertical resolution of chrominance signal in recording it on a VTR.

First, a recording system of the fourth embodiment will be described with reference to FIG. 10. Since a system of the video signal aa is the same as that of the first embodiment, details thereof are omitted. On the other hand, the HD video signal bb (shown in FIG. 12(A)) is supplied through an input terminal B to an A/D converter 5 and converted thereby into a digital signal.

The digital signal is supplied to a first switch circuit SW1 which makes a connection to a contact "a" during an odd numbered scanning line and to a contact "b" during an even numbered scanning line. An output signal (shown in FIG. 12(B)) of the first switch circuit SW1 connected to the contact "a" delayed by 1H period by a 1H delay circuit 49 and an output signal of the first switch circuit SW1 connected to the contact "b" are operated by an adder 50 and a subtractor 51, resulting in a vertical low frequency component (E+0) (shown in FIG. 12(C)) and a vertical high frequency component (E−0) (shown in FIG. 12(D)) between 2 scanning line signals.

The vertical low frequency component (E+0) is divided to a signal component (referred to as "first signal component (E+0)1") having frequency band restricted by a horizontal low-pass filter 52 to about 12 MHz and a high frequency component (E+0)h having frequency band restricted to a band from 12 MHz to 18 MHz by a horizontal band pass filter 53. The high frequency signal is converted into a signal (E+0)h' having frequency from 6 MHz to 12 MHz by means of a frequency converter circuit 54.

On the other hand, the frequency band of the vertical high frequency component (E−0) is restricted to about 6 MHz by means of a horizontal low-pass filter 55. A resultant signal is added to the signal component (E+0)h' obtained from the high frequency component of the vertical low frequency component by frequency conversion, resulting in a second signal component (E−0)+(E+0)h'. Thus, a signal having two dimensional spatial frequency characteristics such as shown in FIG. 11 is obtained. It is known that, since the HD video signal bb is interlace-scanned with 2:1, its effective vertical resolution is obtained by multiplication with Kerr factor. Details thereof is omitted here.

The first and second signal components are written in a first to fourth memories 10 to 18 by using a sixth and seventh switch circuits SW6 and SW7. For a first field, effective scanning line signals of the first and second signal components are written in the first and third memories 10 and 12, respectively, and, for a second field, they are written in the second and fourth memories 11 and 13, respectively. Simultaneously with the write of the second field signals, the first field signals are read from the first and third memories 10 and 12 simultaneously (shown in FIGS. 12 (E) and 12(F)).

By setting the read clock frequency to a half of the write clock frequency, the frequency band of the read signal is converted into a half of the frequency band of the written signal and thus the signal frequency band of 12 MHz is converted into that of 6 MHz. In the fourth embodiment, the high frequency band of the HD image signal is narrowed in this manner, so that it becomes possible to be recorded in the home VTR, and the horizontal synchronizing signal period is increased to convert it into the NTSC, as in the third embodiment. Third field signals are written in the memories which store the first field signals while reading the second field signals are read from the respective memories. This operation is repeated alternatively.

The signals read from the respective memories are supplied through the second and third switch circuits SW2 and SW3 to D/A converters 22 and 23 and converted thereby into analog signals, respectively. Since the signal processing after the D/A converters is the same as that in the third embodiment, details thereof are omitted.

Now, a reproducing system of the fourth embodiment will be described with reference to FIG. 13. The low frequency component (E+0)1 of the first signal component recorded on the magnetic tape T is reproduced by means of the first heads 1a and 1b, amplified to a predetermined level by means of a pre-amplifier 40, demodulated by means of an FM demodulator 44, processed, that is, de-emphasized, etc., by means of a first reproduced signal processing circuit 48 and converted into a digital signal by means of an A/D converter 52. On the other hand, the signals related to the second signal component are reproduced by the second heads 2a and 2b and converted into a digital signal in the same manner as that of the first signal component.

The second signal component reproduced is divided to a high frequency portion and a low frequency portion with a boarder line of 3 MHz by means of a low-pass filter 62 and a high-pass filter 63 to obtain a vertical high frequency component (E−0) and a signal component (E+0)h' obtained by frequency conversion of a high frequency component of the vertical low frequency component. The component (E+0)h' is converted into a signal component (E+0)h by means of a frequency converter circuit 72 and the signal component (E+0)h and the low frequency component (E+0)1, which is an output signal from the low-pass filter 62, of the second signal portion are added by an adder 73, resulting in the first signal component (E+0).

The first signal component (E+0) and the vertical high frequency component (E−0) which is the output signal of the low-pass filter 62 are operated by an adder 70 and a subtractor 71 to obtain odd numbered scanning line signals before recording from the adder 70 and even numbered scanning line signals from the subtractor 71.

The signals of the first field are written simultaneously in the first and third memories 10 and 12 through the sixth and seventh switch circuits SW6 and SW7 connected to the contacts "a", respectively. The signals of the second field are written simultaneously in the second and fourth memories 11 and 13 through the switch circuits SW6 and SW7 connected to the contacts "b", respectively, while the signals written in the first and third memories 10 and 12 are read sequentially. In this case, the read clock frequency is twice the write clock frequency so that the frequency band of the written signal becomes twice, resulting in that the narrow band signal recorded in the VTR can be converted into a wide band signal.

The signal selected by suitably switching an eighth switch circuit SW8 is converted into an analog signal by a D/A converter 74 to obtain the HD image signal bb which is sent to a transmission line which is not shown through an output terminal D. It should be noted that the odd numbered scanning lines can be exchanged with the even numbered scanning lines, with the same effect.

The fourth embodiment has a merit that the magnetic tape T having the HD image signal bb recorded by a VTR according to this embodiment can be reproduced by a conventional home VTR by suitably setting the azimuth angles and the head width of the first and second heads 1a and 1b and 2a and 2b, as in the third embodiment.

That is, in this embodiment, the signals reproduced every two tracks are the signal (E+0)1 of the vertical low frequency and horizontal low frequency portions of the HD video signal. Since the number of scanning lines of the HD video signal bb is converted into 262.5 lines/field which is the same as that of the NTSC system, the reproduced signal can be watched on an NTSC receiver.

Although, in the embodiments described, the audio signal processing has not been described, it is of course possible to provide an audio signal track as for the video signal and to employ an audio signal recording/reproducing processing.

According to the first aspect of the present invention described hereinbefore, the HD image signal is divided to a plurality of video signals which are recorded and reproduced simultaneously. Therefore, it can be recorded on and reproduced from a tape head system of a home VTR.

Further, according to the second aspect of the present invention, dividing means for dividing the HD image signal every N scanning lines to obtain N signal portions is employed and therefore a display screen can be obtained by reproducing any one of the first to Nth video signals and thus it is possible to supply one video signal obtained by equivalently down-converting the HD image signal directly to the conventional television receiver.

Further, according to the third aspect of the present invention, dividing means for dividing the MUSE signal every two scanning lines to obtain the frequency band compressed first and second video signals is employed. Therefore, the dividing means and the subsequent recording and reproducing means in the first aspect can be removed and a complete image can be obtained by either one of the first and second video signals, so that it is possible to supply one video signal obtained by equivalently down-converting the HD image signal directly to the conventional television receiver.

The conversion of the HD image signal system into the conventional video signal system, which is the feature of the present invention, gives merits on manufacture of the magnetic recording and reproducing apparatus. The merits will be described in detail below.

It is necessary, in a pre-manufacturing step, to verify whether or not an assembled circuit board operates normally. However, in a circuit for processing signals digitally, it is impossible to determine whether it is normal by merely observing one bit of several bits constituting a signal on an oscilloscope, etc. In order to observe a series of signals each usually composed of 8 bits or more simultaneously to determine whether the circuit operates normally, an apparatus dedicated thereto must be developed, leading to an increase of manufacturing cost of a recording and reproducing apparatus.

According to the present invention, however, the signal obtained by converting the HD image signal system into the conventional video signal system can be monitored by the conventional television receiver. Therefore, it is possible to easily detect breakage or short-circuit of wirings for signals whose changes can not be detected easily by means of an oscilloscope, etc., on a monitor screen as noise of an image. Since the video signal system is conventional, the monitor may be a usual television receiver which is neither so sophisticated nor locked to a specific frequency and therefore it is possible to use inexpensive manufacturing facility.

These merits are also effective in repair. It is usual that any measuring equipment such as logic analyzer which can observe digital signals directly is not provided in usual service stations, etc. According to these merits, it is possible to repair the apparatus by means of a usual television receiver having a video input terminal only provided that there are an amplifier circuit for amplifying digital signal and a simple jig having a function of attaching a synchronizing signal thereto.

Further, the conversion of the HD image signal system into the conventional video signal system, which is the feature of the present invention, gives another merit that IC's or circuits developed for signal processing of the conventional video signal can be used in the signal processing of the present apparatus. This will be described in detail below.

(1) In an analog VTR, a video signal is frequency-modulated (FM) and recorded. However, it is necessary to control the video signal such that the highest frequency and/or lowest frequency of the signal after FM modulated are fallen within a recordable frequency range. In order to realize this, it is usual to separate synchronizing signals from the video signal and/or clamp or clip the video signal. Circuits having such functions have been formed as IC's and are inexpensive and easily handled. Each such IC is necessarily designed such that it separates the synchronizing signals of a video signal of the conventional system, includes suitable delay circuits and operates with suitable time constants and, therefore, it can not be expected that such IC operates normally with a synchronizing signal whose system is different from the conventional system. In the present invention, however, such IC's can operate normally if the frequency of the synchronizing signal is adjusted to that of the conventional video signal. Further, the video signal processing circuit of the conventional system can be used therefor.

(2) The same is true for the reproduced signal processing circuit. Existing IC's can be used for synchronizing signal separation and noise removal from the reproduced signal.

(3) Existing memories and/or signal processing circuits developed for video signal processing can be used in the digital signal processing circuit since the video signal system is converted into the conventional system. For example, a memory TMS4C1050 of Texas Instruments or similar memory may be used as the first memory 10, etc., of the first embodiment. The IC memory had been developed for digital processing circuit of video signal of the conventional system, such as IDTV, EDTV, ghost canceller, TBC, etc., and is available easily at very low cost.

Further, IC of such as TFIR6400, etc., of ITT Semiconductor can be used as the high-pass filter 63 or low-pass filter 62 of the third embodiment. This IC had been developed for digital processing circuit of video signal of the conventional system, such as IDTV, EDTV, ghost canceller and is available easily at low cost.

Although not described with reference to the embodiments, the present invention can be used to perform a digital signal processing such as a signal emphasis, noise reduction and contour emphasis. In such case, SVP (scanning line video processor) of Texas Instruments may be used.

This IC had been developed for digital processing circuit of video signal of the conventional system, such as IDTV, EDTV and TBC and is available at very low cost.

The feature of the present invention resides in the conversion of the HD video signal system into the conventional video signal system, and, in order to realize it, uses the memories. These memories can be utilized to extraordinary reproduction such as search or still or as a frame noise reducer.

The extraordinary reproduction will be described in detail below.

As is well known in a home VTR, in order to increase recording density on a tape, an azimuth recording is performed. When a signal which was recorded by the azimuth recording is reproduced at different rate such as in a search reproduction, a reproduced signal becomes non-continuous and its visibility on a screen is degraded due to disturbance called noise bars. A conventional measure for such noise bar disturbance in a conventional VTR is to reduce width of the noise bar by making width of a reproducing head larger than that of a recording track, etc. However, when the head width is increased, S/N ratio during a normal or ordinary reproduction may be degraded. Therefore, a method of reducing noise bar by using memories has been proposed.

The latter method when applied to the previously described first embodiment will be described. Since a basic operation is the same as that of a conventional VTR, its description is omitted here.

It is assumed that, for example, a double speed reproduction is performed with four head pairs 1a and 1b, 2a and 2b, 3a and 3b and 4a and 4b. Further it is assumed that one heads (1a, 2a, 3a and 4a) of the head pairs have identical azimuth angles and mounted on identical position on a rotary drum. The switch circuits are connected to the contacts "a" during the heads 1a to 4a are reproducing a first track and signals reproduced by these heads are written in the first to fourth memories, respectively. At a time when these heads complete reproduction of substantially a preceding half of the first track, they are shifted to a second track adjacent to the first track and having a different azimuth angle from the first track. Therefore, signals therefrom are attenuated and the write in the memories is stopped. When the other heads 1b, 2b, 3b and 4b which are disposed on the drum in opposing positions to the one heads are brought into contact with the tape, they do reproduce not the preceding half of the first track but a succeeding half of the first track and signals reproduced by the heads 1b, 2b, 3b and 4b are written in the first to fourth memories in their areas succeeding to areas in which the reproduced signals from the heads 1a, 2a, 3a and 4a were written. By repeating this while switching the connection of the first switch from the contact "a" to the contact "d", sequentially, an original image can be completed. Since, in this case, the memory read speed is higher than the memory write speed as mentioned with respect to the first embodiment, a read address outruns a write address during this operation. Although, for addresses succeeding the write address outrun by the read address, an image of a preceding field is read, this does not make a considerable disturbance unless the video signal contains a fast moving image. A high speed reproduction at a speed higher than double speed becomes also possible similarly.

What is claimed is:

1. A magnetic recording and playback apparatus comprising:

dividing means for receiving a MUSE signal and producing band-compressed first and second video signals from said MUSE signal by dividing said MUSE signal every other scanning line, so that a band-width of said MUSE signal is halved for each of said band-compressed first and second video signals, wherein each of said band-compressed first and second video signals has a horizontal signal period different from that of a conventional video signal, said dividing means further forming a sync-coupling portion in a waveform of each of said band-compressed first and second video signal so that said sync-coupling portion bridges signal segments of each of said band-compressed first and second video signals;

first and second recording signal processing means for processing said respective band-compressed first and second video signals to obtain first and second recording signals, wherein a horizontal sync signal of said conventional video signal is added to said sync-coupling portion of each of said band-compressed first and second video signals, so that each of said first and second recording signals conforms substantially to a signal format of said conventional video signal and is thus interchangeable with a conventional video signal;

first and second recording means for respectively recording said first and second recording signals from said first and second recording signal processing means simultaneously on a recording medium, said first recording means including a pair of first and second heads having different azimuth angles from each other, said second recording means including a pair of third and fourth heads having different azimuth angles from each other, said first to fourth heads respectively forming first to fourth tracks on said recording medium such that said third track is interposed between said first and second tracks and said second track is interposed between said third and fourth tracks;

first and second reproduced signal processing means for reproducing said first and second recording signals recorded by said first and second recording means from said recording medium simultaneously and processing said reproduced first and second recording signals to reproduce said band-compressed first and second video signals; and multiplexing means for multiplexing said band compressed first and second video signals to restore said MUSE signal.

* * * * *